US012626646B2

(12) United States Patent
Lin et al.

(10) Patent No.: US 12,626,646 B2
(45) Date of Patent: May 12, 2026

(54) DISPLAY DRIVING DEVICE COMPRISING AN EMISSION CIRCUIT AND POSITIVE FEEDBACK CIRCUIT AND DISPLAY DRIVING METHOD

(71) Applicant: AUO Corporation, Hsinchu City (TW)

(72) Inventors: Chih-Lung Lin, Hsinchu City (TW); Cheng-Han Ke, Hsinchu City (TW); Jui-Hung Chang, Hsinchu City (TW); Ming-Yang Deng, Hsinchu City (TW); Chia-Tien Peng, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/930,306

(22) Filed: Oct. 29, 2024

(65) Prior Publication Data

US 2025/0148967 A1 May 8, 2025

(30) Foreign Application Priority Data

Nov. 8, 2023 (TW) ................................ 112143089

(51) Int. Cl.
*G09G 3/32* (2016.01)

(52) U.S. Cl.
CPC ....... *G09G 3/32* (2013.01); *G09G 2300/0819* (2013.01); *G09G 2300/0861* (2013.01); *G09G 2320/045* (2013.01); *G09G 2330/021* (2013.01)

(58) Field of Classification Search
CPC ............. G09G 3/32; G09G 2300/0819; G09G 2300/0861; G09G 2320/045; G09G 2330/021
See application file for complete search history.

(56) References Cited

U.S. PATENT DOCUMENTS

| | | | | |
|---|---|---|---|---|
| 11,170,706 | B1 | 11/2021 | Lin | |
| 2018/0006099 | A1 * | 1/2018 | Ka | G09G 3/3233 |
| 2022/0270549 | A1 | 8/2022 | Xuan | |
| 2023/0024912 | A1 * | 1/2023 | Kim | G09G 3/32 |

FOREIGN PATENT DOCUMENTS

| | | | | |
|---|---|---|---|---|
| CN | 104637430 | A | * | 5/2015 |
| TW | 202147282 | A | * | 12/2021 |
| TW | 202209288 | A | | 3/2022 |
| TW | 202416256 | A | | 4/2024 |

OTHER PUBLICATIONS

CN104637430A (Year: 2015).*
TW202147282A (Year: 2021).*

* cited by examiner

*Primary Examiner* — Nathan P Brittingham
(74) *Attorney, Agent, or Firm* — WPAT, PC

(57) ABSTRACT

A display driving device includes an emission circuit and a positive feedback circuit. The emission circuit is coupled to a first node. The emission circuit emits light according to a forward signal, a reverse signal, and a voltage level of the first node. The forward signal and the reverse signal are inversed phase of each other. The positive feedback circuit discharges the first node according to sweep signal.

12 Claims, 11 Drawing Sheets

700

DISPLAY DRIVING DEVICE COMPRISING AN EMISSION CIRCUIT AND POSITIVE FEEDBACK CIRCUIT AND DISPLAY DRIVING METHOD

CROSS-REFERENCE TO RELATED APPLICATION

This application claims priority to Taiwan Application Serial Number 112143089, filed Nov. 8, 2023, which is herein incorporated by reference in its entirety.

BACKGROUND

Field of Invention

This case relate to a driving device and a driving method, and in particular to a display driving device and a display driving method.

Description of Related Art

Currently, in order to achieve high brightness uniformity, a display uses a multi-emission design structure to emit light and modifies a gray scale of the display.

However, the aforementioned design structure has conditions such as the need to increase a driving crossing voltage, longer raising time and falling time, etc., resulting in an increase in the power of the display. Therefore, how to design to solve the above problems is an important issue in this field.

SUMMARY

The Invention content is intended to provide a simplified summary of this disclosure to provide the reader with a basic understanding of this disclosure. The Invention content is not a complete summary of this disclosure and is not intended to point out important/critical components of this embodiment or to define the scope of this case.

One of the technical patterns in this case relates to a display driving device. The display driving device includes an emission circuit and a positive feedback circuit. The emission circuit is coupled to a first node. The emission circuit emits light based on a forward signal, a reverse signal, and a voltage level of the first node. The forward signal and the reverse signal are inversed phase of each other. The positive feedback circuit discharges the first node based on a sweep signal.

One of the technical patterns in this case relates to a display driving method. The display driving method includes the following operations: emitting light based on the forward signal, the reverse signal, and the voltage level of the first node by the emission circuit, and discharging the first node based on the sweep signal by the positive feedback circuit. The emission circuit is coupled to the first node, the positive feedback circuit includes a second node, and the first node and the second node are different from each other. The forward signal and the reverse signal are inversed phase of each other.

Therefore, according to the technical content of this case, the display driving device and the display driving method as shown in the embodiments of this case can raise the voltage level of the node with a control circuit and the positive feedback circuit to accelerate a turning on time and reduce the raising time of the emission current.

The basic spirit and other purposes of the invention, as well as the technical means and manner of implementation adopted herein, can be readily understood by the people having ordinary skill in the art, by reference to the manner of implementation set forth below.

BRIEF DESCRIPTION OF THE DRAWINGS

In order to above and other purposes, features, advantages, and embodiments more readily apparent and understandable, illustrations of accompanying drawings are as follows.

Figure 1:
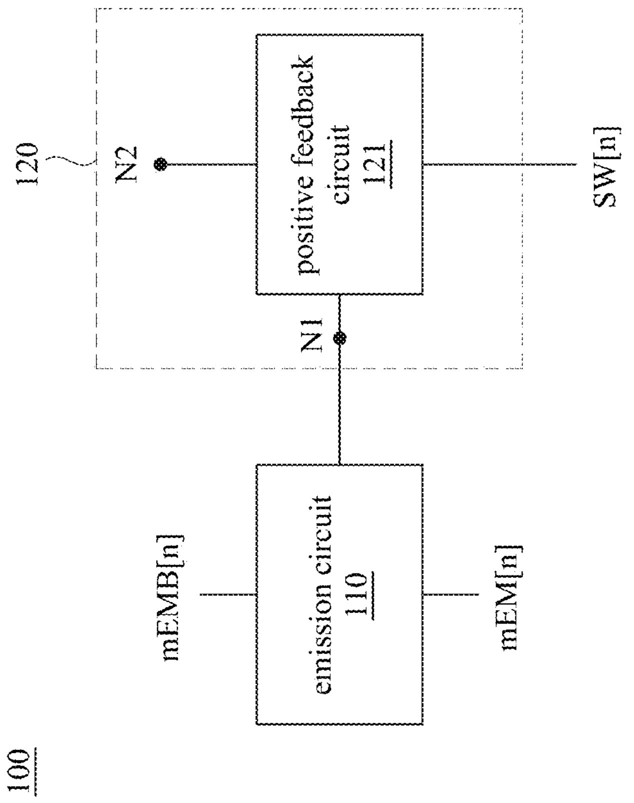
FIG. 1 illustrates a diagram of a display driving device, in accordance with one embodiment of a present disclosure.

In accordance with customary practice, the various features and components in the drawings are not drawn to scale and are drawn in such a way as to best present the specific features and components relevant to this case. In addition, the same or similar component symbols are used to refer to similar components/parts between drawings.

DETAILED DESCRIPTION

For the purpose of completing the description of this disclosure, the following is an illustrative description of the manner of implementation and specific embodiments of this case. However, this is not the only form of implementation or utilization of the specific embodiments of this case. The implementation approach covers the characteristics of multiple specific implementations as well as the operation and order of methods used to construct and operate them. However, other embodiments may be utilized to achieve the same or equivalent functionality and the order of the operation.

Unless otherwise defined herein, scientific and technical terms used herein shall have the same meanings as those commonly understood and utilized by people having ordinary skill in the art in this case. In addition, where not inconsistent with the context, a singular term used herein covers the plural form of the term, and a plural term used herein covers the singular form of the term.

In addition, “couple” or “connect” as used herein may refer to two or more components making direct physical or electrical contact with each other, or making indirect physical or electrical contact with each other, or to two or more components operating or acting in conjunction with each other.

In this document, the term “circuit” is used to refer to an object that consists of one or more transistor(s) and/or one or more active and passive components that are connected in a certain way to process a signal.

Certain terms are used in the specification and scope of claims to refer to specific components. However, the people having ordinary skill in the art realize that the same components can be referred to by different terms. The specification and scope of the claims do not distinguish components by name differences, but rather by functional differences. The word “include” in the specification and scope of the claims is open-ended and should be interpreted as “include but not limited to”.

FIG. 1 illustrates a diagram of a display driving device, in accordance with one embodiment of a present disclosure. As shown in FIG. 1, in one embodiment, the display driving device 100 includes an emission circuit 110 and a driving circuit 120. The driving circuit 120 includes a positive feedback circuit 121, nodes N1 and N2. In connection relation, the emission circuit 110 is coupled to the driving circuit 120, and the emission circuit 110 is coupled to the node N1.

In some embodiments, the nodes N1 and/or N2 are located an external part of the positive feedback circuit 121. In some embodiments, the nodes N1 and/or N2 are located an internal part of the positive feedback circuit 121.

In some embodiments, in operation, the emission circuit 110 is configured to emit light based on a forward signal mEM[n], a reverse signal mEMB[n], and a voltage level of the node N1.

For example, the emission circuit 110 can have a light emitter, and the light emitter described above can emit light based on the forward signal mEM[n], the reverse signal mEMB[n], and the voltage level of the node N1, but the present disclosure is not limited to them.

In this embodiment, timing waveforms of the forward signal mEM[n] and timing waveforms of the reverse signal mEMB[n] are opposite to each other.

Figure 3:
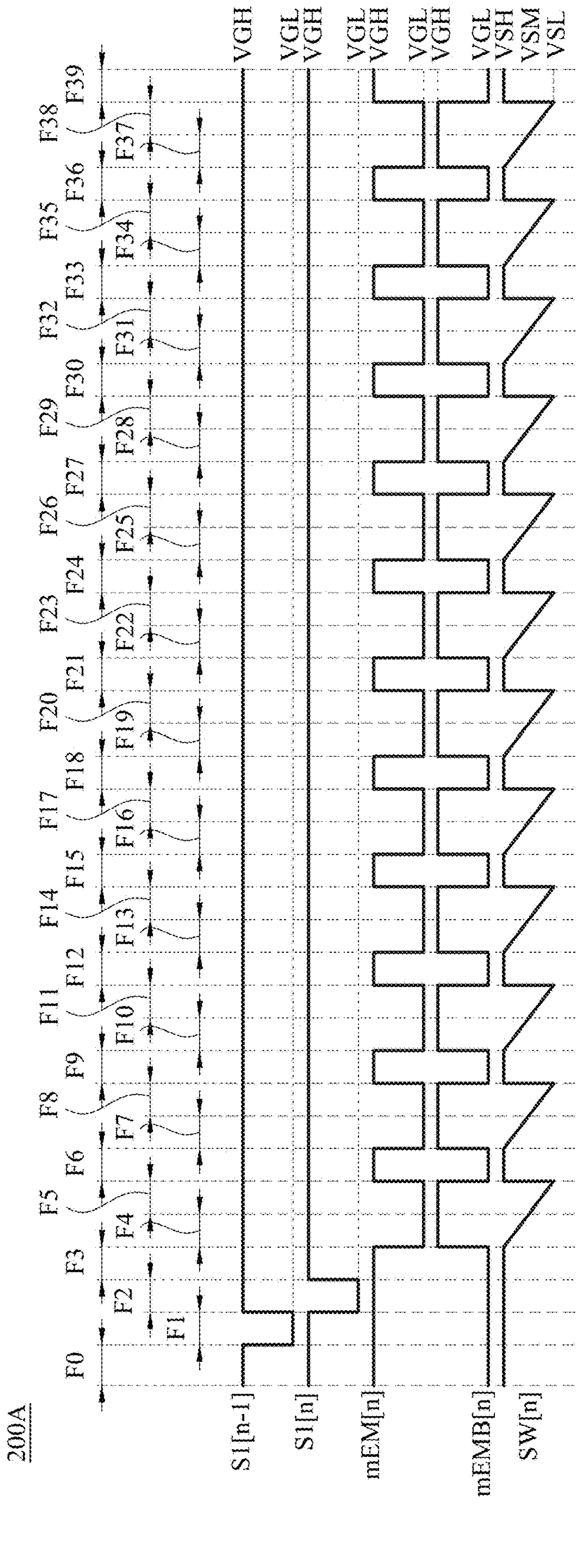
FIG. 3 illustrates a timing diagram of a plurality of signals of the display driving device, in accordance with one embodiment of the present disclosure.

For example, the forward signal mEM[n] and the reverse signal mEMB[n] can be inverse waveforms to each other (as shown in FIG. 3 below), and the forward signal mEM[n] and the reverse signal mEMB[n] can be generated from each other by an inverter, but the present disclosure is not limited to them.

In some embodiments, the forward signal mEM[n] and the reverse signal mEMB[n] are inversed phase of each other, and the forward signal mEM[n] and the reverse signal mEMB[n] can be generated from each other by the inverter, but the present disclosure is not limited to them.

In addition, since the emission circuit 110 of the present disclosure can be driven without using an emission signal (or an EM signal), the emission circuit 110 of the present disclosure can be driven to emit light by the forward signal mEM[n] and the reverse signal mEMB[n], and the forward signal mEM[n] and the reverse signal mEMB[n] can be generated from each other by the inverter, so it can achieve the effect of reducing the complexity of peripheral driving circuits and power consumption.

In this embodiment, the positive feedback circuit 121 is configured to discharge the node N1 based on a sweep signal SW.

For example, the positive feedback circuit 121 can reduce the voltage level of the node N1, e.g., the positive feedback circuit 121 can modify the voltage level of the node N1 to a negative voltage level or 0 voltage (V), but the present disclosure is not limited to them.

In some embodiments, the positive feedback circuit 121 can improve the voltage level of the node N1, e.g., the positive feedback circuit 121 can modify the voltage level of the node N1 greater than a voltage level of an origin voltage level or a positive voltage level, but the present disclosure is not limited to them.

Figure 2:
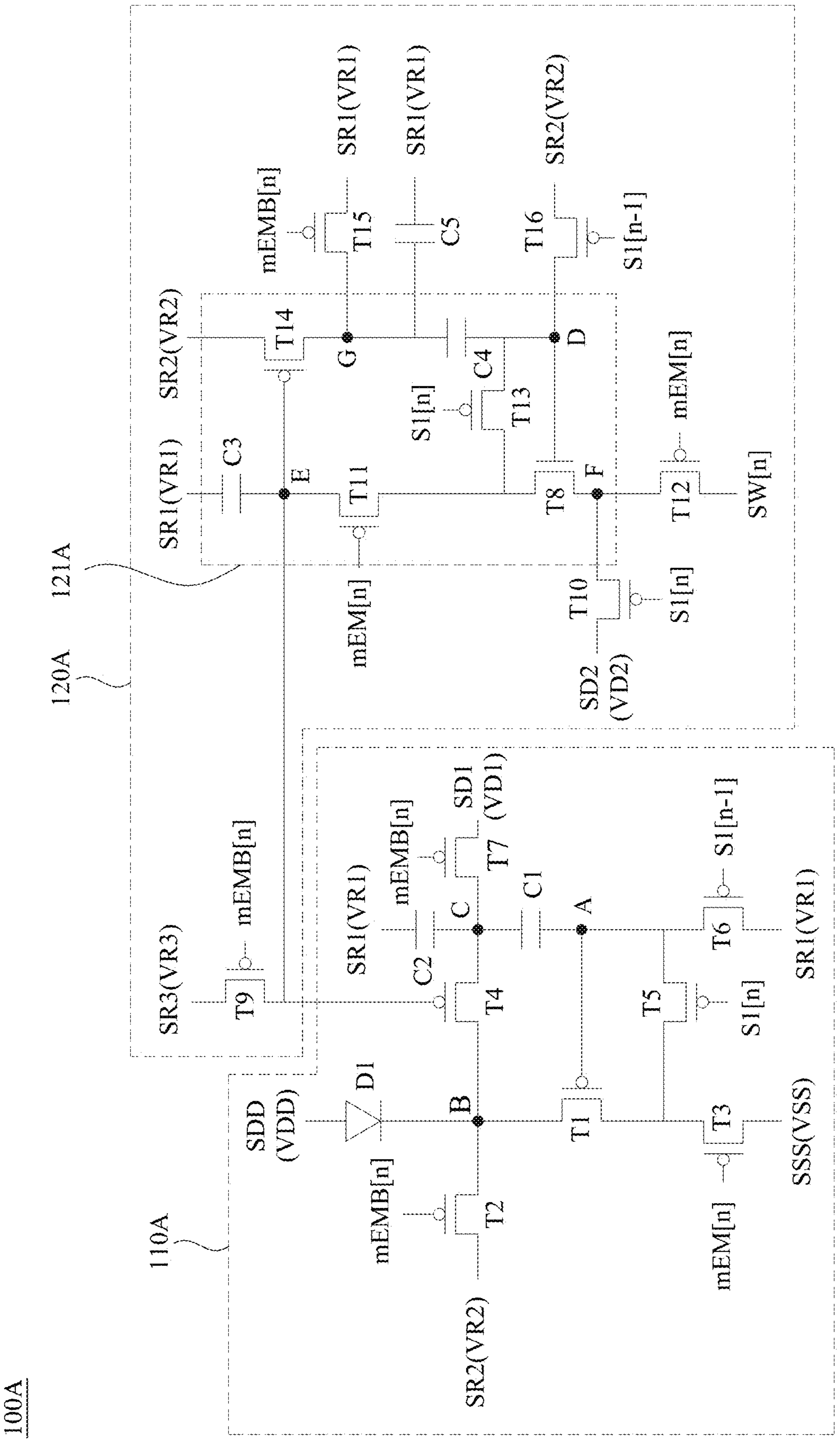
FIG. 2 illustrates a detailed circuit diagram of the display driving device, in accordance with one embodiment of the present disclosure.

FIG. 2 illustrates a detailed circuit diagram of the display driving device, in accordance with one embodiment of the present disclosure. As shown in FIG. 2, in some embodiments, a display driving device 100A includes an emission circuit 110A and a driving circuit 120A. The driving circuit 120A includes a positive feedback circuit 121A.

For example, the display driving device 100A, the emission circuit 110A, the driving circuit 120A, and the positive feedback circuit 121A of FIG. 2 can correspond to the display driving device 100, the emission circuit 110, the driving circuit 120, and the positive feedback circuit 121 of FIG. 1 respectively, but the present disclosure is not limited to them.

In addition, a terminal E of FIG. 2 can correspond to the node N1 of FIG. 1, and a terminal D of FIG. 2 can correspond to the node N2 of FIG. 1. The forward signal mEM[n], the reverse signal mEMB[n], and the sweep signal SW[n] of FIG. 2 can correspond to the forward signal mEM[n] respectively, the reverse signal mEMB[n], and the sweep signal SW[n] of FIG. 1, but the present disclosure is not limited to them.

In some embodiments, the emission circuit 110A includes a plurality of transistors T1-T7, a light emitter D1, and a plurality of capacitors C1, C2. The capacitor C1 includes a terminal A and a terminal C. One terminal of the capacitor C2 is configured to receive the reference signal SR1, and the other terminal of the capacitor C2 is coupled to the terminal C. One terminal of the light emitter D1 is configured to receive a power supply signal SDD, and the other terminal of the light emitter D1 is coupled to a terminal B.

In this embodiment, one terminal of the transistor T1 is coupled to the terminal B. Another terminal of the transistor T1 is coupled to the transistor T3. A control terminal of the transistor T1 is coupled to the terminal A. One terminal of the transistor T2 is configured to receive a reference signal SR2. Another terminal of the transistor T2 is coupled to the terminal B. A control terminal of the transistor T2 is configured to receive the reverse signal mEMB[n]. One terminal of the transistor T3 is configured to receive a pull-down signal SSS. Another terminal of the transistor T3 is coupled to the transistor T5. A control terminal of the transistor T3 is configured to receive the forward signal mEM[n].

In this embodiment, One terminal of the transistor T4 is coupled to the terminal B. Another terminal of the transistor T4 is coupled to the terminal C. A control terminal of the transistor T4 is configured to be coupled to the driving circuit 120A (or the terminal E of the driving circuit 120A). One terminal of the transistor T5 is coupled to the transistor T1. Another terminal of the transistor T5 is coupled to the terminal A. A control terminal of the transistor T5 is configured to receive a scan signal S1[*n*]. One terminal of the transistor T6 is configured to receive the reference signal SR1. Another terminal of the transistor T6 is coupled to the terminal A. A control terminal of the transistor T6 is configured to receive a scan signal S1[*n*−1]. One of the transistor T7 is configured to receive a data signal SD1. Another terminal of the transistor T7 is coupled to the terminal C. A control terminal of the transistor T7 is configured to receive the reverse signal mEMB[n].

In some embodiments, the driving circuit 120A includes a plurality of transistors T8-T16 and a plurality of capacitors C3-C5. One terminal of the capacitor C3 is configured to receive a reference signal SR1, and the other terminal of the capacitor C3 is coupled to the terminal E. The capacitor C4 includes the terminal D and a terminal G. One terminal of the capacitor C5 is configured to receive the reference signal SR1, and the other terminal of the capacitor C5 is coupled to the terminal G.

In this embodiment, one terminal of the transistor T8 is coupled to a terminal F. Another terminal of the transistor T8 is coupled to the transistor T11. A control terminal of the transistor T8 is coupled to the terminal D. One terminal of the transistor T9 is configured to receive a reference signal SR3. Another terminal of the transistor T9 is coupled to the terminal E. A control terminal of the transistor T9 is configured to receive the reverse signal mEMB[n]. One terminal of the transistor T10 is configured to receive a data signal SD2. Another terminal of the transistor T10 is coupled to the terminal F. A control terminal of the transistor T10 is configured to receive the scan signal S1[*n*].

In this embodiment, one terminal of the transistor T11 is coupled to the transistor T8. Another terminal of the transistor T11 is coupled to the terminal E. A control terminal of the transistor T11 is configured to receive the forward signal mEM[n]. One terminal of the transistor T12 is configured to receive the sweep signal SW[n]. Another terminal of the transistor T12 is coupled to the terminal F. A control terminal of the transistor T12 is configured to receive the forward signal mEM[n]. One terminal of transistor T13 is coupled to the transistor T8. Another terminal of the transistor T13 is coupled to the terminal D. A control terminal of the transistor T13 is configured to receive the scan signal S1[*n*].

In this embodiment, one terminal of the transistor T14 is configured to receive the reference signal SR2. Another terminal of the transistor T14 is coupled to the terminal G. A control terminal of the transistor T14 is coupled to the terminal E. One terminal of the transistor T15 is configured to receive the reference signal SR1. Another terminal of the transistor T15 is coupled to the terminal G. A control terminal of the transistor T15 is configured to receive the reverse signal mEMB[n]. One terminal of the transistor T16 is configured to receive the reference signal SR2. Another terminal of the transistor T16 is coupled to the terminal D. A control terminal of the transistor T16 is configured to receive the scan signal S1[*n*−1].

In some embodiments, the data signal SD1 can be a pulse amplitude modulation (PAM) signal, and the data signal SD2 can be a pulse width modulation (PWM), but the present disclosure is not limited to them.

In some embodiments, the transistors T1, T2 and T5 can form a compensation circuit, and the compensation circuit described above can be configured to compensate a threshold voltage level of the transistor T1 (VTH_T1), but the present disclosure is not limited to them.

In some embodiments, the transistors T8, T10 and T13 can form the compensation circuit, and the compensation circuit described above can be configured to compensate a threshold voltage level of the transistor T8 (VTH_T8), but the present disclosure is not limited to them.

In some embodiments, the transistors T8, T11, T13, T14 and the capacitor C4 can form the positive feedback circuit 121A, and the positive feedback circuit 121A described above can accelerate opening of the transistors T8 and/or T4, but the present disclosure is not limited to them.

In some embodiments, the transistors T1-T16 can be any type of the transistors.

For example, the transistors T1-T16 can be P type metal oxide semiconductor (PMOS) transistors, N type metal oxide semiconductor (NMOS) transistors, thin film transistors (TFTs), or other different types of switching elements, but the present disclosure is not limited to them.

Furthermore, the transistors T1-T7, T9-T16 can be P type thin film transistors, and the transistor T8 can be an N type thin film transistor, but the present disclosure is not limited to them.

In some embodiments, the reference signal SR1 has a voltage level VR1. The reference signal SR2 has a voltage level VR2. The reference signal SR3 has a voltage level VR3. The data signal SD1 has a voltage level VD1. The data signal SD2 has a voltage level VD2. The power supply signal SDD has a voltage level VDD. The pull-down signal SSS has a voltage level VSS.

In some embodiments, the voltage level VR3 is greater than the voltage level VD1. The voltage level VD1 is greater than the voltage level VR2. The voltage level VR2 is greater than the voltage level VDD. The voltage level VDD is greater than the voltage level VR1. The voltage level VR1 is greater than the voltage level VSS.

For example, the voltage level VR3 can be 12 volts (V), the voltage level VD1 can be 10V, the voltage level VR2 can be 7V, the voltage level VDD can be 5V, the voltage level VD1 can be 3V, and the voltage level VSS can be 0V, but the present disclosure is not limited to them.

In some embodiments, the voltage level VR2 can be greater than the voltage level VD2, but the present disclosure is not limited to them.

In some embodiments, the data signal SD2 can determine emission time of the emission element D1, and the data signal SD1 can determine a current value flowing through the emission element D1, but the present disclosure is not limited to them.

In some embodiments, the emission circuit 110A can correspond to a pulse amplitude modulation (PAM) circuit. The driving circuit 120A can correspond to a pulse width modulation (PWM).

In some embodiments, the light emitter D1 can be any type of emission diodes (LEDs). For example, the light emitter D1 can be a micro LED, a mini LED, or an organic LED (OLED), but the present disclosure is not limited to them. In addition, the light emitter D1 can be a LED of any color, e.g., red, green, or blue LED, but the present disclosure is not limited to them.

In some embodiments, a display can have a scanning device and the display driving device 100. The scanning device is coupled to the display driving device 100, and the scanning device can provide a plurality of scan signals to the display driving device 100 by a plurality of scan lines.

For example, the scan signals can be the scan signals S1[*n*−1] and S1[*n*], and n can be a positive integer greater than 2, but the present disclosure is not limited to them.

In some embodiments, n of the scan signal S1[*n*−1], the scan signal S1[*n*], the sweep signal SW[n], the forward signal mEM[n], and the reverse signal mEMB[n] can be a positive integer greater than 1 or 2, but the present disclosure is not limited to them.

Please refer to FIG. 1 and FIG. 2 together, in one embodiment, the emission circuit 110A includes the first transistor T4, the first capacitor C1, and the second capacitor C2. The second capacitor C2 is coupled to the first capacitor C1. The control terminal of the first transistor T4 is coupled to a first node N1, and the first terminal C of the first transistor T4 is coupled to the first capacitor C1 and the second capacitor C2. The first capacitor C1 is configured to receive the reference signal SR1. The node N1 is configured to receive the sweep signal SW[n].

For example, the first node N1 of FIG. 1 can correspond to the terminal E of FIG. 2, but the present disclosure is not limited to them.

In one embodiment, the positive feedback circuit 121A includes the second transistor T8 and the third capacitor C4. The third capacitor C4 is coupled to a second node N2. The control terminal of the second transistor T8 is coupled to the second node N2. The second transistor T8 is configured to provide the sweep signal SW[n] to the first node N1. The positive feedback circuit 121A discharges the first node N1 based on the sweep signal SW[n] and a voltage level of the second node N2.

For example, the second node N2 of FIG. 1 can correspond to the terminal D of FIG. 2, but the present disclosure is not limited to them.

FIG. 3 illustrates a timing diagram of a plurality of signals of the display driving device, in accordance with one embodiment of the present disclosure. As shown in FIG. 3, in some embodiments, a timing diagram 200A of FIG. 3 includes periods F0-F39 in sequence.

For example, the timing diagram 200A of FIG. 3 can correspond to an operation of different signals shown in FIG. 2, e.g., the operation of the scan signal S1[*n*−1], the scan signal S1[*n*], the forward signal mEM[n], the reverse signal mEMB[n], and the sweep signal SW[n], but the present disclosure is not limited to them.

In some embodiments, during the period F0-F39, the scan signal S1[*n*−1] can be operated between voltage levels VH and VL, the scan signal S1[*n*] can be operated between the voltage levels VH and VL, the forward signal mEM[n] can be operated between the voltage levels VH and VL, the reverse signal mEMB[n] can be operated between the voltage levels VH and VL, sweep signal SW[n] can be operated between voltage levels VSH, VSM, and VSL, and the voltage level VSM is between the voltage levels VSH and VSL.

For example, an absolute value of a potential difference between the voltage levels VH and VL can be 20V, the absolute value of the potential difference between the voltage levels VSH and VSL can be 10V, the voltage level VH can be 15V, the voltage level VL can be −5V, and the voltage level VSH can be 15V, the voltage level VSL can be 5V, but the present disclosure is not limited to them.

Please refer to FIG. 2 and FIG. 3 together, in some embodiments, the voltage level VH is greater than the voltage level VR3. The voltage level VR3 is greater than the voltage level VD1. The voltage level VD1 is greater than the voltage level VR2. The voltage level VR2 is greater than the voltage level VDD. The voltage level VDD is greater than the voltage level VSH. The voltage level VSH is greater than the voltage level VR1. The voltage level VR1 is greater than the voltage level VSS. The voltage level VSS is greater than the voltage level VSL. The voltage level VSL is greater than the voltage level VL.

In some embodiments, the voltage level VR2 is greater than the voltage level VD2. The voltage level VD2 is greater than the voltage level VL, but the present disclosure is not limited to them.

In some embodiments, the voltage level VH can be a disable voltage level of the transistors T1-T7, T9-T16, and the voltage level VL can be an enable voltage level of the transistors T1-T7, T9-T16. The voltage level VH can be an enable voltage level of the transistor T8, and the voltage level VL can be a disable voltage level of the transistor T8.

For example, the transistors T1-T7, T9-T16 can be turned off based on the voltage level VH, the transistors T1-T7, T9-T16 can be turned on based on the voltage level VL, the transistor T8 can be turned on based on the voltage level VH, and the transistor T8 can be turned off based on the voltage level VL, but the present disclosure is not limited to them.

In some embodiments, the timing diagram 200A of FIG. 3 can be regarded as one frame.

For example, the display driving device 100A of FIG. 2 can perform an operation of the timing diagram 200A to complete an operation of emitting light of one frame, but the present disclosure is not limited to them.

Figure 4:
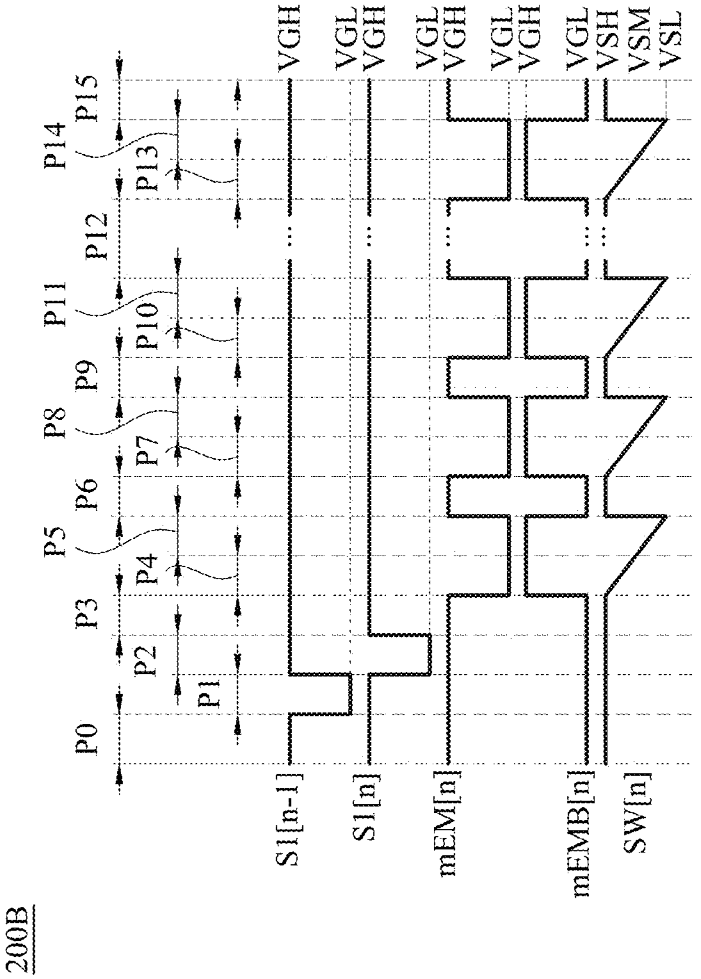
FIG. 4 illustrates a timing diagram of the plurality of signals of the display driving device, in accordance with one embodiment of the present disclosure.

FIG. 4 illustrates a timing diagram of the plurality of signals of the display driving device, in accordance with one embodiment of the present disclosure. As shown in FIG. 4, in some embodiments, a timing diagram 200B of FIG. 4 includes periods P0-P15 in sequence.

For example, the timing diagram 200B of FIG. 4 can correspond to an operation of different signals shown in FIG. 2, e.g., the operation of the scan signal S1[*n*−1], the scan signal S1[*n*], the forward signal mEM[n], the reverse signal mEMB[n] and the sweep signal SW[n], but the present disclosure is not limited to them.

In some embodiments, a duration of the period P1 can be 1H, a duration of a period P3 can be 1H, and durations of periods P4 and P5 can be 2H, but the present disclosure is not limited to them.

Please refer to FIG. 3 and FIG. 4 together, in some embodiments, the timing diagram 200B of FIG. 4 can correspond the timing diagram 200A of FIG. 3.

For example, a part of the period of the timing diagram 200B of FIG. 4 can overlap a part of the period of the timing diagram 200A of FIG. 3, e.g., operations of the periods F0-F5 of FIG. 3 are similar to operations of the periods P0-P5 of FIG. 4, operations of the periods F6-F8, F9-F11, F12-F14, F15-F17, F18-F20, F21-F23, F24-F26, F27-F29, F30-F32, F33-F35, or F36-F38 of FIG. 3 are similar to operations of the periods P6-P8, and an operation of the period F39 of FIG. 3 is similar to an operation of the period P15 of FIG. 4, in addition. For brevity, some descriptions will not be repeated.

Figure 5:
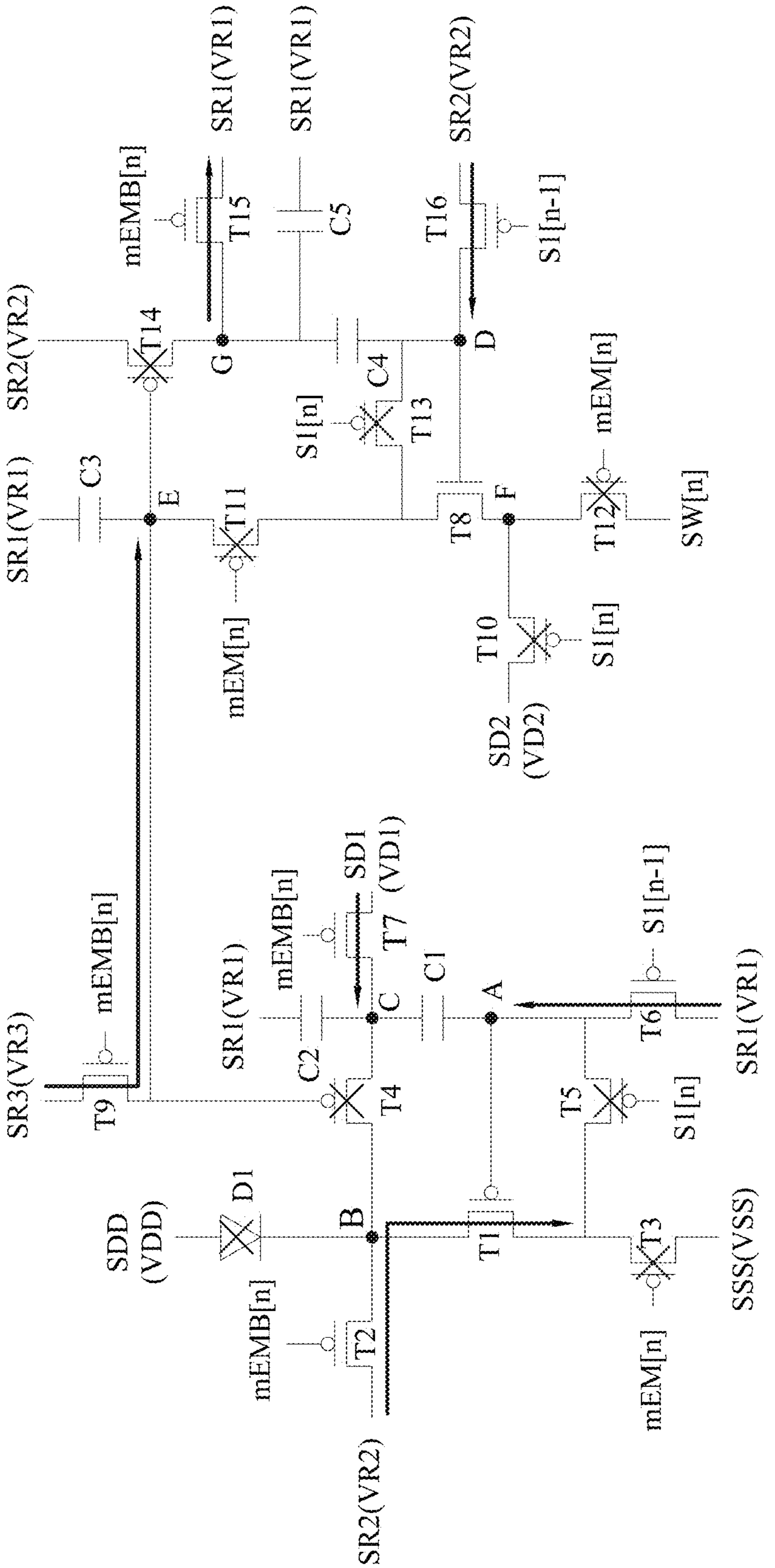
FIG. 5 illustrates a using context diagram of the display driving device, in accordance with one embodiment of the present disclosure.

FIG. 5 illustrates a using context diagram of the display driving device, in accordance with one embodiment of the present disclosure. As shown in FIG. 5, in some embodiments, FIG. 5 demonstrates an operation corresponding to the display driving device 100A in FIG. 2, as it operates according to a section of the timing diagram 200B in FIG. 4.

For example, FIG. 5 can depict an operation of the display driving device 100A during the period P1 of the timing diagram 200B.

Please refer to FIG. 2, FIG. 4, and FIG. 5 together, in one embodiment, the emission circuit 110A includes the capacitor C1, and the positive feedback circuit 121A includes the capacitor C4. The capacitor C1 includes the terminal A and the terminal C, and the capacitor C4 includes the terminal D and the terminal G.

In this embodiment, during the period P1, the emission circuit 110A modifies a voltage level of the terminal A and a voltage level of the terminal C based on the reference signal SR1 and the data signal SD1.

For example, during the period P1, the transistors T3, T4, T5 of the emission circuit 110A can be turned off. The transistor T2 is turned on based on the reverse signal mEMB[n], and the transistor T2 provides the reference signal SR2 to the terminal B to modify a voltage level of the terminal B to the voltage level VR2. The transistor T6 is turned on based on the scan signal S1[*n*−1], and the transistor T6 provides the reference signal SR1 to the terminal A, the voltage level of the terminal A to the voltage level VR1. The transistor T7 is turned on based on the reverse signal mEMB[n], and the transistor T7 provides the data signal SD1 to the terminal C, to modify the voltage level to the terminal C to the voltage level VD1, but the present disclosure is not limited to them.

In this embodiment, during the period P1, the positive feedback circuit 121A modifies a voltage level of the terminal D and a voltage level of the terminal G based on the reference signal SR2 and the reference signal SR1. A voltage level of the reference signal SR2 is greater than a voltage level of the reference signal SR1.

For example, during the period P1, the transistors T10-T14 of the driving circuit 120A can be turned off. The transistor T9 is turned on based on the reverse signal mEMB[n], and the transistor T9 provides the reference signal SR3 to the terminal E to modify a voltage level of the terminal E to the voltage level VR3. The transistor T15 is turned on based on the reverse signal mEMB[n], and the transistor T15 provides the reference signal SR1 to the terminal G to modify the voltage level of the terminal G to the voltage level VR1. The transistor T16 is turned on based on the scan signal S1[*n*−1], and the transistor T16 provides the reference signal SR2 to the terminal D to modify a voltage level of the terminal D to the voltage level VR2. In addition, a voltage level of the terminal F in this time can be the voltage level VSH, but the present disclosure is not limited to them.

In some embodiments, the period P1 can be called a reset period, but the present disclosure is not limited to them.

Figure 6:
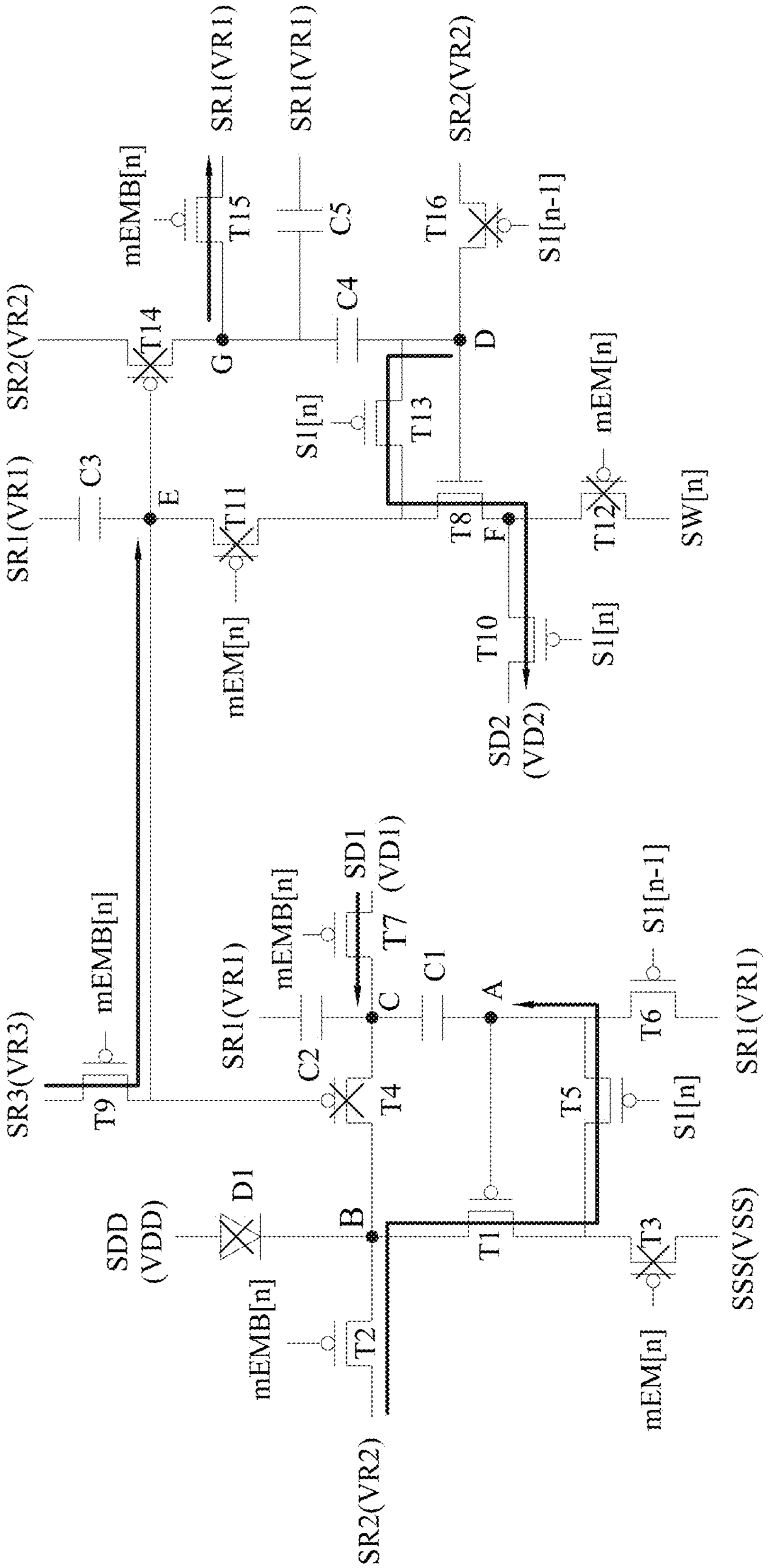
FIG. 6 illustrates a using context diagram of the display driving device, in accordance with one embodiment of the present disclosure.

FIG. 6 illustrates a using context diagram of the display driving device, in accordance with one embodiment of the present disclosure. As shown in FIG. 6, in some embodiments, FIG. 6 demonstrates an operation corresponding to the display driving device 100A in FIG. 2, as it operates according to a section of the timing diagram 200B in FIG. 4.

For example, FIG. 6 can depict an operation of the display driving device 100A during the period P2 of the timing diagram 200B.

Please refer to FIG. 2, FIG. 4, and FIG. 6 together, in one embodiment, the emission circuit 110A moreover includes the driving transistor T1, and the driving transistor T1 has the threshold voltage level |VTH_T1|. The positive feedback circuit 121A moreover includes the control transistor T8, and the control transistor T8 has the threshold voltage level |VTH_T8|.

In this embodiment, during the period P2, the emission circuit 110A modifies the voltage level of the terminal A based on the reference signal SR2 and the threshold voltage level |VTH_T1|.

For example, during the period P2, the transistors T3, T4, T6 of the emission circuit 110A can be turned off. The transistor T2 is turned on based on the reverse signal mEMB[n], and the transistor T2 provides the reference signal SR2 to the terminal B to maintain the voltage level VR2 of the terminal B. The transistor T1 is turned on based on the voltage level of the terminal A. The transistor T5 is turned on based on the scan signal S1. The transistors T2, T1, T5 provide the reference signal SR2 to the terminal A to modify the voltage level of the terminal A to a voltage level (VR2−|VTH_T1|). The transistor T7 is turned on based on the reverse signal mEMB[n], and the transistor T7 provides the data signal SD1 to the terminal C to maintain the voltage level VD1 of the terminal C.

In this embodiment, during the period P2, the positive feedback circuit 121A modifies the voltage level of the terminal D based on the data signal SD2 and the threshold voltage level |VTH_T8|.

For example, during the period P2, the transistors T11, T12, T14, T16 of the driving circuit 120A can be turned off. The transistor T9 is turned on based on the reverse signal mEMB[n], and the transistor T9 provides the reference signal SR3 to the terminal E to maintain the voltage level VR3 of the terminal E. The transistor T15 is turned on based on the reverse signal mEMB[n], and the transistor T15 provides the reference signal SR1 to the terminal G to maintain the voltage level VR1 of the terminal G. The transistor T10 is turned on based on the scan signal S1[*n*], and the transistor T10 provides the data signal SD2 to the terminal F to modify the voltage level of the terminal F to the voltage level VD2. The transistor T8 is turned on based on the voltage level of the terminal D. The transistor T13 is turned on based on the scan signal S1[*n*]. The transistors T10, T8, T13 provide the data signal SD2 to the terminal D to modify the voltage level of the terminal D to a voltage level (VD2+|VTH_T8|).

In some embodiments, the period P2 can be call a compensation period, but the present disclosure is not limited to them. In summary, the display driving device 100A can compensate for a threshold voltage variation of the transistor T1 by the transistors T1, T2, T5 and can compensate for a threshold voltage variation of the transistor T8 by the transistors T8, T10, T13, but the present disclosure is not limited to them.

In some embodiments, the transistors T1, T2, T5 can form a first compensation circuit, and the transistors T8, T10, T13 can form a second compensation circuit, but the present disclosure is not limited to them.

Figure 7:
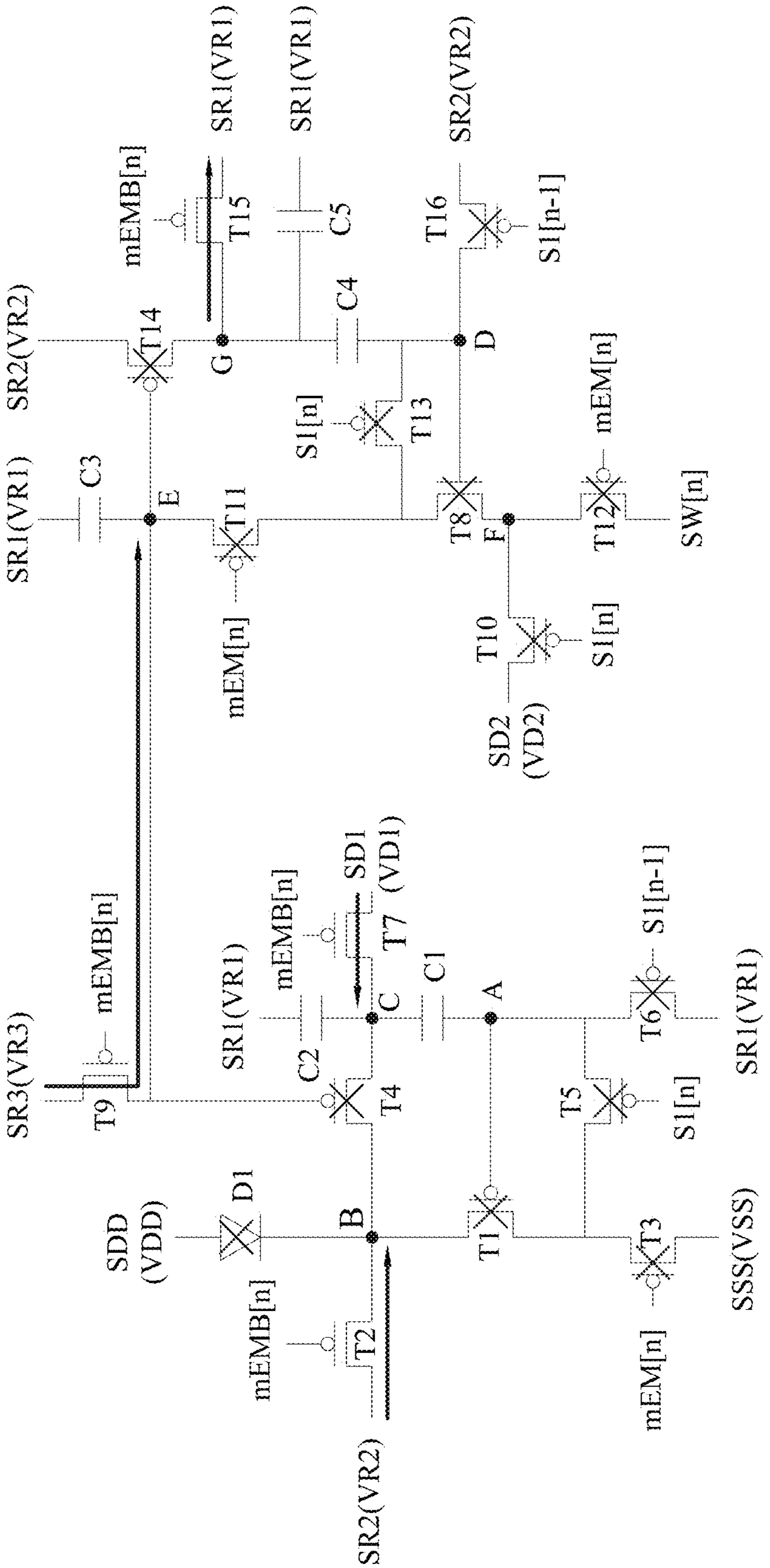
FIG. 7 illustrates a using context diagram of the display driving device, in accordance with one embodiment of the present disclosure.

FIG. 7 illustrates a using context diagram of the display driving device, in accordance with one embodiment of the present disclosure. As shown in FIG. 7, in some embodiments, FIG. 7 demonstrates an operation corresponding to the display driving device 100A in FIG. 2, as it operates according to a section of the timing diagram 200B in FIG. 4.

For example, FIG. 7 can depict an operation of the display driving device 100A during the period P3, P6, or P9 of the timing diagram 200B.

In some embodiments, the operation of the period P3 is the same as the operation of period P6. The operation of the period P6 is the same as an operation of the period P9, but the present disclosure is not limited to them.

Please refer to FIG. 2, FIG. 4, and FIG. 7 together, in one embodiment, during the period P3, the control transistor T8 of the positive feedback circuit 121A is turned off based on the voltage level of the terminal D.

For example, during the period P3, the transistors T8, T10-T14, T16 of the driving circuit 120A can be turned off. The transistor T9 is turned on based on the reverse signal mEMB[n], and the transistor T9 provides the reference signal SR3 to the terminal E to maintain the voltage level VR3 of the terminal E. The transistor T15 is turned on based on the reverse signal mEMB[n], and the transistor T15 provides the reference signal SR1 to the terminal G to maintain the voltage level VR1 of the terminal G. The terminal D maintains the voltage level (VD2+|VTH_T8|), and the control transistor T8 is turned off based on the voltage level (VD2+|VTH_T8|) of the terminal D, but the present disclosure is not limited to them.

In some embodiments, during the period P3, the transistors T1, T3-T6 of the emission circuit 110A can be turned off. The transistor T2 is turned on based on the reverse signal mEMB[n], and the transistor T2 provides the reference signal SR2 to the terminal B to maintain the voltage level VR2 of the terminal B. The transistor T7 is turned on based on the reverse signal mEMB[n], and the transistor T7 provides the data signal SD1 to the terminal C to maintain the voltage level VD1 of the terminal C. The terminal A maintains the voltage level (VR2−|VTH_T1|), and the transistor T1 is turned off based on the voltage level (VR2−|VTH_T1|) of the terminal A, but the present disclosure is not limited to them.

In some embodiments, the period P3 can be called a stable period, but the present disclosure is not limited to them.

Figure 8:
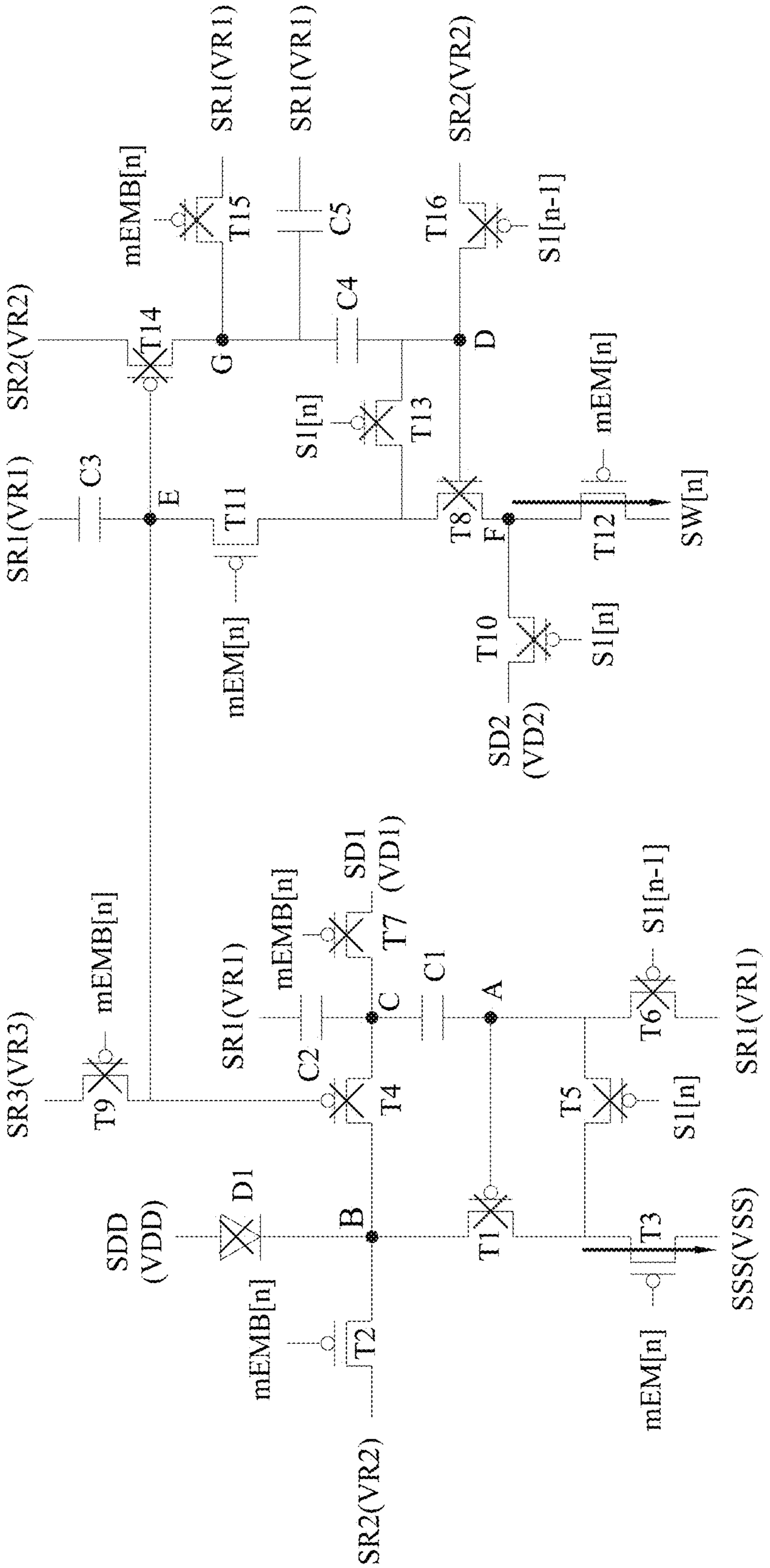
FIG. 8 illustrates a using context diagram of the display driving device, in accordance with one embodiment of the present disclosure.

FIG. 8 illustrates a using context diagram of the display driving device, in accordance with one embodiment of the present disclosure. As shown in FIG. 8, in some embodiments, FIG. 8 demonstrates an operation corresponding to the display driving device 100A in FIG. 2, as it operates according to a section of the timing diagram 200B in FIG. 4.

For example, FIG. 8 can depict an operation of the display driving device 100A during the period P4, P7, P10, or P13 of the timing diagram 200B.

In some embodiments, the operation of the period P4 is the same as the operation of the period P7. The period P7 is the same as an operation of the period P10. The operation of the period P10 is the same as an operation of the period P13, but the present disclosure is not limited to them.

Please refer to FIG. 2, FIG. 4, and FIG. 8 together, in one embodiment, the control transistor T8 includes the terminal F. During the period P4, the positive feedback circuit 121A modifies the voltage level of the terminal F based on a voltage variation level (ΔV) of the sweep signal SW[n].

For example, during the period P4, the transistors T8-T10, T13-T16 of the driving circuit 120A can be turned off. The transistor T12 is turned on based on the forward signal mEM[n], and the transistor T12 provides the voltage variation level (ΔV) of the sweep signal SW[n] to the terminal F to modify the voltage level of the terminal F to a voltage level (VSH−|ΔV|). In this time, the terminal D maintains the voltage level (VD2+|VTH_T8|), the terminal G maintains the voltage level VR1, and the terminal E maintains the voltage level VR3, but the present disclosure is not limited to them.

In some embodiments, during the period P4, the transistors T1, T2, T4-T7 of the emission circuit 110A can be turned off. The transistor T3 is turned on based on the forward signal mEM[n], and the transistor T3 provides the pull-down signal SSS. In this time, the terminal A maintains the voltage level (VR2-|VTH_T1|), the terminal C maintains the voltage level VD1, and the terminal C maintains the voltage level VR2, but the present disclosure is not limited to them.

In addition, the voltage variation level (ΔV) can be a difference of the voltage level VSH and the voltage level VSM, but the present disclosure is not limited to them.

In some embodiments, for the transistor T8, when a voltage level (VGS_T8) of a gate-to-source voltage level is greater than the voltage level (|VTH_T8|), the transistor T8 is turned on, and the transistor T8 can satisfy the following equations 1-3.

$$VGS\_T8 > |VTH\_T8|. \quad \text{equation 1}$$

$$VD2 + |VTH\_T8| - (VSH - |\Delta V|) > |VTH\_T8|. \quad \text{equation 2}$$

$$|\Delta V| > VSH - VD2. \quad \text{equation 3}$$

As mentioned above, the equation 3 can be derived from the equation 1 and the equation 2 in sequence, and the transistor T8 is turned on when the transistor T8 satisfies the equation 3, but the present disclosure is not limited to them.

In some embodiments, the period P4 can be called a first emission period, but the present disclosure is not limited to them.

Figure 9:
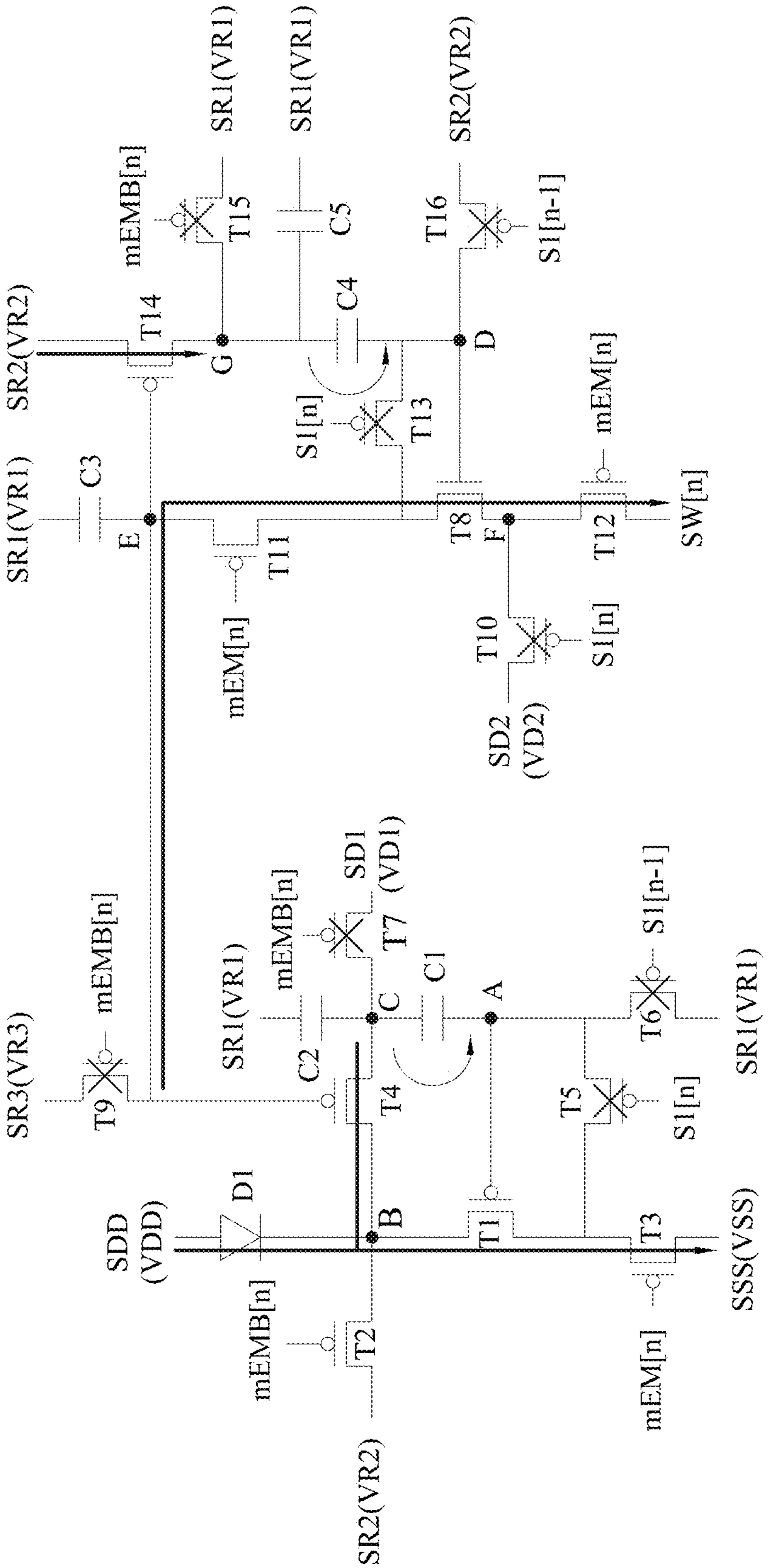
FIG. 9 illustrates a using context diagram of the display driving device, in accordance with one embodiment of the present disclosure.

FIG. 9 illustrates a using context diagram of the display driving device, in accordance with one embodiment of the present disclosure. As shown in FIG. 9, in some embodiments, FIG. 9 demonstrates an operation corresponding to the display driving device 100A in FIG. 2, as it operates according to a section of the timing diagram 200B in FIG. 4.

For example, FIG. 9 can depict an operation of the display driving device 100A during the period P5, P8, P11, or P14 of the timing diagram 200B.

In some embodiments, the operation of the period P5 is the same as the operation of the period P8. The operation of the period P8 is the same as an operation of the period P11. The operation of the period P11 is the same as an operation of the period P14, but the present disclosure is not limited to them.

Please refer to FIG. 2, FIG. 4, and FIG. 9 together, in one embodiment, during the period P5, the positive feedback circuit 121A modifies the voltage level of the terminal G and the voltage level of the terminal G based on the reference signal SR2.

For example, during the period P5, the transistors T9, T10, T13, T15, and T16 of the driving circuit 120A can be turned off. The transistor T14 is turned on based on the voltage level of the terminal E, and the transistor T14 provides the reference signal SR2 to the terminal G to modify the voltage level of the terminal G to the voltage level VR2. The capacitor C4 modifies the voltage level of the terminal D to the voltage level (VD2+|VTH_T8|+VR2−VR1) by a capacitive coupling, but the present disclosure is not limited to them.

In this embodiment, during the period P5, the control transistor T8 of the positive feedback circuit 121A is turned on based on the voltage level of the terminal D, and a switch of the emission circuit is turned on based on the voltage variation level (ΔV) of the sweep signal SW[n].

For example, during the period P5, the transistor T12 is turned on based on the forward signal mEM, and the transistor T12 provide the voltage variation level (ΔV) of the sweep signal SW[n] to the terminal F to maintain the voltage level (VSH−|ΔV|) of the terminal F. The control transistor T8 is turned on the voltage level of the terminal D. The transistor T11 is turned on based on the forward signal mEM. The transistors T12, T8, T11 provide the voltage variation level (ΔV) of the sweep signal SW[n] to the terminal E to modify the voltage level of the terminal E to the voltage level (VSH−|ΔV|).

In this embodiment, the light emitter D1 of the emission circuit 110A has a voltage level (VLED) of the light emitter. During the period P5, the emission circuit 110A modifies the voltage level of the terminal A and the voltage level of the terminal C based on the power supply signal SDD and the voltage level (VLED) of the light emitter. The driving transistor T1 outputs a driving signal (ILED) based on the voltage level of the terminal A, and the light emitter D1 emits light based on the driving signal (ILED).

For example, during the period P5, the transistors T2, T5, T7, T9 of the emission circuit 110A can be turned off. The transistor T3 is turned on based on the forward signal mEM. The transistor T1 is turned on based on the voltage level of the terminal A. The transistors T1, T3 provide the pull-down signal SSS to the light emitter D1, so the light emitter D1 is turned on. The transistor T4 is turned on based on the voltage level of the terminal E, and the transistor T4 provides the power supply signal SDD to the terminal C, to modify the voltage level of the terminal C to a voltage level (VDD-VLED). The capacitor C1 modifies the voltage level of the terminal A to a voltage level (VR2-|VTH_T1|+VDD-VLED-VD1) by the capacitive coupling, and the transistor T1 is turned on based on the voltage level (VR2–|VTH_T1|+VDD–VLED–VD1) of the terminal A, but the present disclosure is not limited to them.

In addition, the driving signal (ILED) can be matched with the following equations 4-5, but the present disclosure is not limited to them.

$$ILED = K\times(VDD - VLED - (VR2 - |VTH\_T1| + VDD - VLED - VD1) - |VTH\_T1|)^2. \quad \text{equation 4}$$

$$ILED = K\times(VD1 - VR2)^2. \quad \text{equation 5}$$

As mentioned above, the equation 5 can be obtained from the equation 4, and K can be any parameter. It is clear from the equation 5 that the driving signal (ILED) is irrelevant to the voltage level (|VTH_T1|) and the voltage level VDD, thus achieving the effect of compensation.

In some embodiments, the period P5 can be called a second emission period, but the present disclosure is not limited to them.

Figure 10:
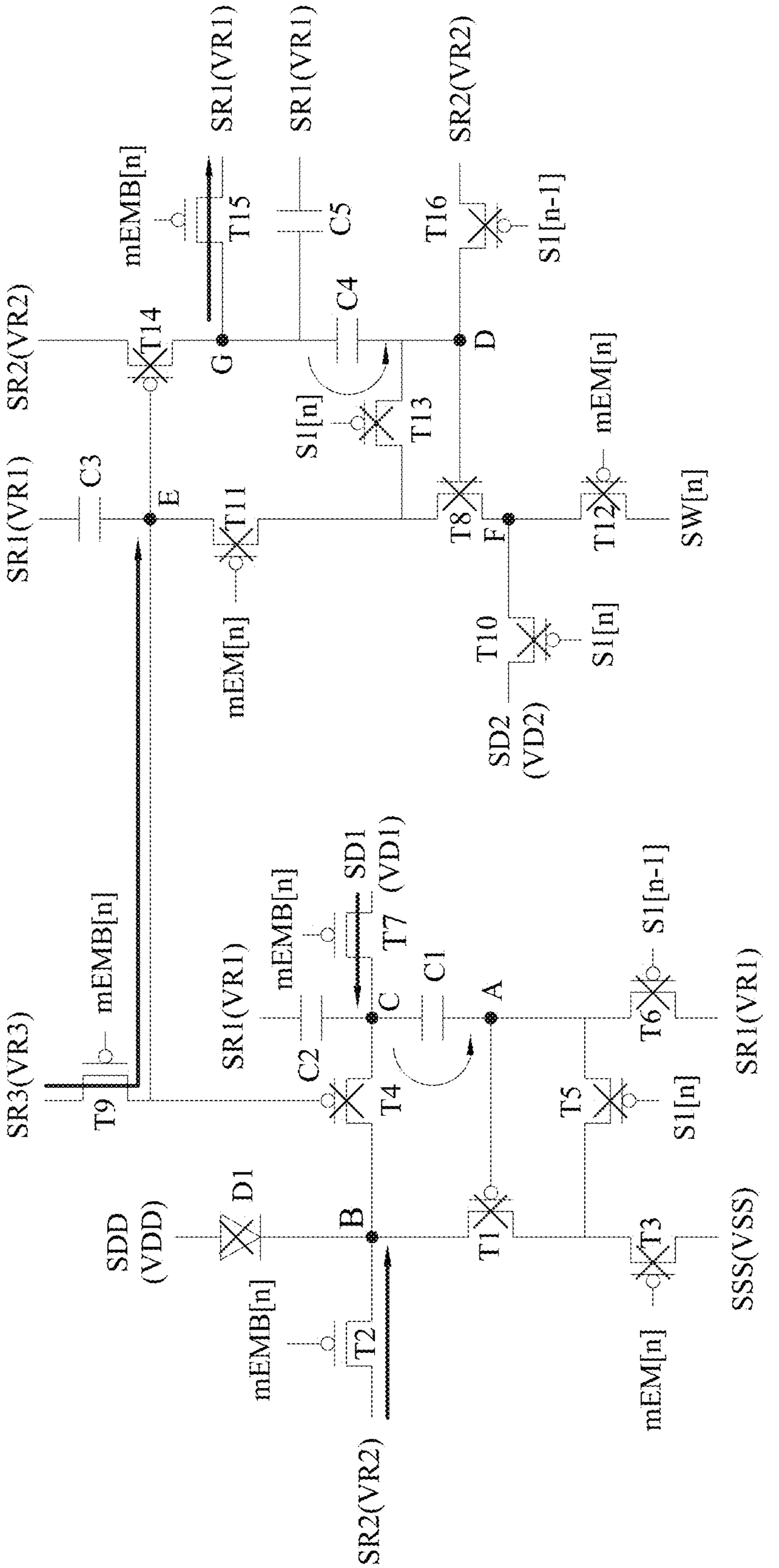
FIG. 10 illustrates a using context diagram of the display driving device, in accordance with one embodiment of the present disclosure.

FIG. 10 illustrates a using context diagram of the display driving device, in accordance with one embodiment of the present disclosure. As shown in FIG. 10, in some embodiments, FIG. 10 demonstrates an operation corresponding to the display driving device 100A in FIG. 2, as it operates according to a section of the timing diagram 200B in FIG. 4.

For example, FIG. 10 can depict an operation of the display driving device 100A during the period P0 or P15 of the timing diagram 200B.

In some embodiments, the operation of the period P0 is the same as the operation of the period P15, but the present disclosure is not limited to them.

Please refer to FIG. 2, FIG. 4, and FIG. 10 together, in one embodiment, during the period P10, the emission circuit 110A modifies the voltage level of the terminal C and the voltage level of the terminal A based on the data signal SD1.

For example, during the period P10, the transistors T1, T3-T6 of the emission circuit 110A can be turned off. The transistor T2 is turned on based on the reverse signal mEMB[n], and the transistor T2 provides the reference signal SR2 to the terminal B to modify the voltage level of the terminal B to the voltage level VR2. The transistor T7 is turned on based on the reverse signal mEMB[n], and the transistor T7 provides the data signal SD1 to the terminal C to modify the voltage level of the terminal C to the voltage level VD1. The capacitor C1 modifies the voltage level of the terminal A to the voltage level (VR2–|VTH_T1|) by the capacitive coupling, but the present disclosure is not limited to them.

In this embodiment, during the period P10, the positive feedback circuit 121A modifies the voltage level of the terminal G and the voltage level of the terminal D based on the reference signal SR1.

For example, during the period P10, the transistors T8, T10-T14, T16 of the positive feedback circuit 121A can be turned off, and the transistor T9 is turned on based on the reverse signal mEMB[n], and the transistor T9 provides the reference signal SR3 to the terminal E to modify the voltage level of the terminal E to the voltage level VR3. The transistor T15 is turned on based on the reverse signal mEMB[n], and the transistor T15 provides the reference signal SR1 to the terminal G to modify the voltage level of the terminal G to the voltage level VR1. The capacitor C4 modifies the voltage level of the terminal D to the voltage level (VD2+|VTH_T8|) by the capacitive coupling, but the present disclosure is not limited to them.

Please refer to FIG. 2 and FIG. 5 to FIG. 10 together, in some embodiments, the operation of the period P8 can be a continuous repetition of the operations of the periods P3-P8, e.g., the period P8 can be 10 periods P3-P8, but the present disclosure is not limited to them. In some embodiments, the operation of the period P8 can be the operation of any period (or the operation of any combination of periods), but the present disclosure is not limited to them.

In some embodiments, the display driving device 100, 100A in this case can be applied to the micro LED splicing the display, but the present disclosure is not limited to them.

In some embodiments, the display driving device 100, 100A in this case can compensate the threshold voltage level (TFT VTH) of the thin film transistor and a variation of a voltage drop (VDD I-R drop) of the power supply signal and can use a PWM driving method make all gray scales of the micro LED can be operated at an optimal emitting light efficiency point, but the present disclosure is not limited to them.

In some embodiments, the display driving device 100, 100A in this case can reduce use of panel signal lines to reduce a ratio of a gate the driving circuit (gate on array, GOA) to a pixel area, and the display driving device 100 in this case can reduce a raising time of a micro LED current for a gray scale modification, but the present disclosure is not limited to them.

In some embodiments, the display driving device 100, 100A in this case can reduce an impact of the threshold voltage level (VTH) of compensating for the driving transistor (e.g., the transistor T1) and the control transistor (e.g., the transistor T8) and the voltage level VDD of the power supply signal SDD on the micro LED current and can reduce the raising time of the micro LED current by accelerating the turning on of the thin film transistor (TFT), but the present disclosure is not limited to them.

Figure 11:
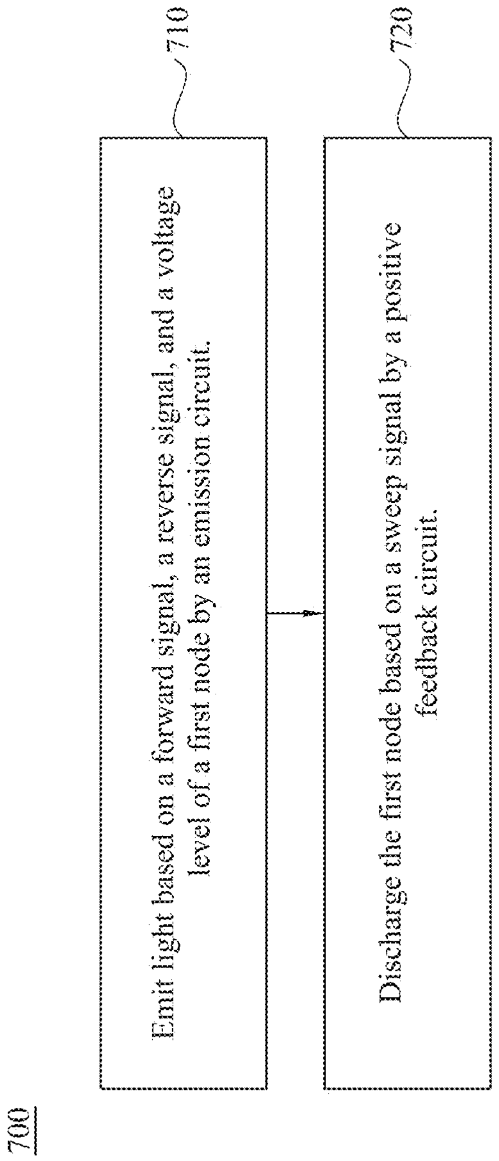
FIG. 11 illustrates a flow chart of operations of the display driving method, in accordance with one embodiment of the present disclosure.

FIG. 11 illustrates a flow chart of operations of the display driving method, in accordance with one embodiment of the present disclosure. As shown in FIG. 11, a display driving method 700 includes an operation 710 and an operation 720, and the operations of the display driving method 700 of FIG. 11 are described in detail below.

In the operation 710, the emission circuit emits light based on the forward signal, the reverse signal, and a voltage level of the first node.

In one embodiment, please refer to FIG. 1 and FIG. 11, the emission circuit 110 emits light based on the forward signal mEM[n], the reverse signal mEMB[n], and the voltage level of the node N1.

In this embodiment, the emission circuit 110 is coupled to the first node N1, the positive feedback circuit 121 includes the second node N2, and the first node N1 and the second node N2 are different from each other.

In this embodiment, the timing waveforms of the forward signal mEM[n] and the timing waveforms of the reverse signal mEMB[n] are opposite to each other.

For example, an operation of the display driving method 700 is similar to the operation of the display driving device 100A of FIG. 2. For brevity, descriptions of other operations of the display driving method 700 will be omitted here.

In some embodiments, the forward signal mEM[n] and the reverse signal mEMB[n] are inversed phase of each other, and the forward signal mEM[n] and the reverse signal mEMB[n] can be generated from each other by the inverter, but the present disclosure is not limited to them.

In the operation 720, the positive feedback circuit discharges the first node based on the sweep signal.

In one embodiment, please refer to FIG. 1 and FIG. 11, the positive feedback circuit 121 discharges the node N1 based on the sweep signal SW.

For example, the operation of the display driving method 700 is similar to the operation of the display driving device 100A of FIG. 2. For brevity, the descriptions of other operations of the display driving method 700 will be omitted here.

Please refer to FIG. 1, FIG. 2, and FIG. 11 together, in one embodiment, the emission circuit 110A includes the first transistor T4, the first capacitor C1, and the second capacitor C2. The second capacitor C2 is coupled to the first capacitor C1. The terminal of the first transistor T4 is coupled to the first node N1. The first terminal C of the first transistor T4 is coupled to the first capacitor C1 and the second capacitor C2. The first capacitor C1 is configured to receive the reference signal SR1. The first node N1 is configured to receive the sweep signal SW[n].

For example, the operation of the display driving method 700 is similar to the operation of the display driving device 100A of FIG. 2. For brevity, the descriptions of other operations of the display driving method 700 will be omitted here.

Please refer to FIG. 1, FIG. 2, and FIG. 11 together, in one embodiment, the positive feedback circuit 121A includes the second transistor T8 and the third capacitor C4. The third capacitor C4 is coupled to the second node N2. The control terminal of the second transistor T8 is coupled to the second node N2. The second transistor T8 is configured to provide the sweep signal SW[n] to the first node N1.

In this embodiment, the positive feedback circuit 121A discharges the first node N1 based on the sweep signal SW[n] and the voltage level of the second node N2. For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 5, and FIG. 11 together, in one embodiment, the emission circuit 110A includes the capacitor C1, and the positive feedback circuit 121A includes the capacitor C4. The capacitor C1 includes the terminal A and the terminal C, and the capacitor C4 includes the terminal D and the terminal G.

In this embodiment, during the period P1, the emission circuit 110A modifies the voltage level of the terminal A and the voltage level of the terminal C based on the reference signal SR1 and the data signal SD1.

In this embodiment, during the period P1, the positive feedback circuit 121A modifies the voltage level of the terminal D and the voltage level of the terminal G based on the reference signal SR2 and the reference signal SR1. The voltage level of the reference signal SR is greater than the voltage level of the reference signal SR1.

For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 6, and FIG. 11 together, in one embodiment, the emission circuit 110A moreover includes the driving transistor T1, and the driving transistor T1 has the threshold voltage level |VTH_T1|. The positive feedback circuit 121A moreover includes the control transistor T8, and the control transistor T8 has the threshold voltage level |VTH_T8|.

In this embodiment, during the period P2, the emission circuit 110A modifies the voltage level of the terminal A based on the reference signal SR2 and the threshold voltage level |VTH_T1|.

In this embodiment, during the period P2, the positive feedback circuit 121A modifies the voltage level of the terminal D based on the data signal SD2 and the threshold voltage level |VTH_T8|.

For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 7, and FIG. 11 together, in one embodiment, during the period P3, the control transistor T8 of the positive feedback circuit 121A is turned off based on the voltage level of the terminal D.

For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 8, and FIG. 11 together, in one embodiment, the control transistor T8 includes the terminal F. During the period P4, the positive feedback circuit 121A modifies the voltage level of the terminal F based on the voltage variation level (ΔV) of the sweep signal SW[n].

For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 9, and FIG. 11 together, in one embodiment, during the period P5, the positive feedback circuit 121A modifies the voltage level of the terminal G and the voltage level of the terminal G based on the reference signal SR2.

In this embodiment, during the period P5, the control transistor T8 of the positive feedback circuit 121A is turned on based on the voltage level of the terminal D, and the switch of the emission circuit is turned on based on the voltage variation level (ΔV) of the sweep signal SW[n].

In this embodiment, the light emitter D1 of the emission circuit 110A has the voltage level (VLED) of the light emitter. During the period P5, the emission circuit 110A modifies the voltage level of the terminal A and the voltage level of the terminal C based on the power supply signal SDD and the voltage level (VLED) of the light emitter, the driving transistor T1 outputs the driving signal (ILED) based on the voltage level of the terminal A, and the light emitter D1 emits light based on the driving signal (ILED).

For example, the operation of the display driving method 700 is similar to the operation of the display driving device 100A of FIG. 2. For brevity, the descriptions of other operations of the display driving method 700 will be omitted here.

Please refer to FIG. 2, FIG. 4, FIG. 10, and FIG. 11 together, in one embodiment, during the period P10, the emission circuit 110A modifies the voltage level of the terminal C and the voltage level of the terminal A based on the data signal SD1.

In this embodiment, during the period P10, the positive feedback circuit 121A modifies the voltage level of the terminal G and the voltage level of the terminal D based on the reference signal SR1.

For example, the operation of the display driving method 700 is similar to the operation of the display driving device 100A of FIG. 2. For brevity, the descriptions of other operations of the display driving method 700 will be omitted here.

In some embodiments, the display driving method 700 in this case can be applied to the micro LED splicing the display, but the present disclosure is not limited to them.

In some embodiments, the display driving method 700 in this case can compensate the threshold voltage level (TFT VTH) of the thin film transistor and the variation of the voltage drop (VDD I-R drop) of the power supply signal and can use the PWM driving method make all gray scales of the micro LED can be operated at the optimal emitting light efficiency point, but the present disclosure is not limited to them.

In some embodiments, the display driving method 700 in this case can reduce use of panel signal lines to reduce the ratio of the gate the driving circuit (gate on array, GOA) to the pixel area, and the display driving device 100 in this case can reduce the raising time of the micro LED current for the gray scale modification, but the present disclosure is not limited to them.

In some embodiments, the display driving method 700 in this case can reduce the impact of the threshold voltage level (VTH) of compensating for the driving transistor (e.g., the transistor T1) and the control transistor (e.g., the transistor T8) and the voltage level VDD of the power supply signal SDD on the micro LED current and can reduce the raising time of the micro LED current by accelerating the turning on of the thin film transistor (TFT), but the present disclosure is not limited to them.

In some embodiments, the transistor T8 of the display driving method 700 in this case during an emission stage, because of the terminal D coupled to a higher voltage level, can generate a larger current to discharge the terminal E to accelerate a turning on of the transistor T4 and reduce the raising time of an emission current.

As can be seen from the embodiments of this case, the application of this case has the following advantages. The display driving device and the display driving method as shown in the embodiments of this case can raise the voltage level of the node with a control circuit and the positive feedback circuit to accelerate a turning on time and reduce the raising time of the emission current.

Although the above implementation method discloses the specific implementation examples of this case, it is not intended to limit this case. The people having ordinary skill in the art may make various changes and modifications to them without departing from the principle and spirit of this case, so the scope of protection in this case shall be based on the scope of protection defined in the claims.

What is claimed is:

1. A display driving device, comprising:

an emission circuit coupled to a first node and configured to emit light based on a forward signal, a reverse signal, and a voltage level of the first node, wherein the emission circuit comprises a first capacitor comprising a first terminal and a second terminal; and a positive feedback circuit configured to discharge the first node based on a sweep signal, wherein the positive feedback circuit comprises a second capacitor comprising a third terminal and a fourth terminal;

wherein the forward signal and the reverse signal are inversed phase of each other;

wherein the emission circuit modifies a voltage level of the first terminal and a voltage level of the second terminal based on a first reference signal and a first data signal during a first period;

wherein the positive feedback circuit modifies a voltage level of the third terminal and a voltage level of the fourth terminal based on a second reference signal and the first reference signal during the first period;

wherein a voltage level of the second reference signal is greater than a voltage level of the first reference signal.

2. The display driving device of claim 1, wherein the emission circuit comprises:

a first transistor; and a third capacitor coupled to the first transistor and configured to receive the first reference signal;

wherein a control terminal of the first transistor is coupled to the first node, and a fifth terminal of the first transistor is coupled to the first capacitor and the third capacitor;

wherein the first node is configured to receive the sweep signal.

3. The display driving device of claim 2, wherein the positive feedback circuit comprises:

a second transistor configured to provide the sweep signal to the first node; and a fourth capacitor coupled to a second node;

wherein a control terminal of the second transistor is coupled to the second node;

wherein the positive feedback circuit discharges the first node based on the sweep signal and a voltage level of the second node.

4. The display driving device of claim 1, wherein the emission circuit further comprises a driving transistor, and the driving transistor has a first threshold voltage level;

wherein the positive feedback circuit further comprises a control transistor, and the control transistor has a second threshold voltage level;

wherein the emission circuit modifies the voltage level of the first terminal based on the second reference signal and the first threshold voltage level during a second period;

wherein the positive feedback circuit modifies the voltage level of the third terminal based on a second data signal and the second threshold voltage level during the second period.

5. The display driving device of claim 4, wherein the control transistor of the positive feedback circuit is turned off based on the voltage level of the third terminal during a third period.

6. The display driving device of claim 5, wherein the control transistor comprises a fifth terminal;

wherein the positive feedback circuit modifies a voltage level of the fifth terminal based on a voltage variation level of the sweep signal during a fourth period.

7. The display driving device of claim 6, wherein the positive feedback circuit modifies the voltage level of the third terminal and the voltage level of the fourth terminal based on the second reference signal during a fifth period;

wherein the control transistor of the positive feedback circuit is turned on based on the voltage level of the third terminal, and a switch of the emission circuit is turned on based on the voltage variation level of the sweep signal;

wherein a light emitter of the emission circuit has a voltage level of the light emitter;

wherein the emission circuit modifies the voltage level of the first terminal and the voltage level of the second terminal based on a power supply signal and the voltage level of the light emitter, wherein the driving transistor outputs a driving signal based on the voltage level of the first terminal, and the light emitter emits light based on the driving signal during the fifth period.

8. The display driving device of claim 7, wherein the emission circuit modifies the voltage level of the first terminal and the voltage level of the second terminal based on the first data signal during a sixth period;

wherein the positive feedback circuit modifies the voltage level of the third terminal and the voltage level of the fourth terminal based on the first reference signal during the sixth period.

9. A display driving method, comprising:

emitting light based on a forward signal, a reverse signal, and a voltage level of a first node by an emission circuit;

wherein the emission circuit is coupled to the first node, wherein a positive feedback circuit comprises a second node, and the first node and the second node are different from each other;

discharging the first node based on a sweep signal by the positive feedback circuit;

wherein the forward signal and the reverse signal are inversed phase of each other;

modifying, by the emission circuit, a voltage level of a first terminal of a first capacitor in the emission circuit and a voltage level of a second terminal of the first capacitor in the emission circuit based on a first reference signal and a first data signal during a first period; and modifying, by the positive feedback circuit, a voltage level of a third terminal of a second capacitor in the positive feedback circuit and a voltage level of a fourth terminal of the second capacitor in the positive feedback circuit based on a second reference signal and the first reference signal during the first period;

wherein a voltage level of the second reference signal is greater than a voltage level of the first reference signal.

10. The display driving method of claim 9, further comprising:

receiving the sweep signal by the first node.

11. The display driving method of claim 9, further comprising:

providing the sweep signal to the first node by a transistor of the positive feedback circuit.

12. The display driving method of claim 11, further comprising:

discharging the first node based on the sweep signal and a voltage level of the second node by the positive feedback circuit;

wherein a control terminal of the transistor is coupled to the second node.

* * * * *